(12) United States Patent
Ogino (10) Patent No.: US 11,983,011 B2
(45) Date of Patent: May 14, 2024

(54) VEHICLE DRIVING ASSIST SYSTEM

(71) Applicant: SUBARU CORPORATION, Tokyo (JP)

(72) Inventor: Shuu Ogino, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 243 days.

(21) Appl. No.: 17/136,500

(22) Filed: Dec. 29, 2020

(65) Prior Publication Data

US 2021/0263519 A1    Aug. 26, 2021

(30) Foreign Application Priority Data

Feb. 20, 2020   (JP) .................. 2020-027464

(51) Int. Cl.
   *G05D 1/02*   (2020.01)
   *B60W 60/00*  (2020.01)
   *G05D 1/00*   (2006.01)

(52) U.S. Cl.
   CPC ....... *G05D 1/0214* (2013.01); *B60W 60/0015* (2020.02); *G05D 1/0088* (2013.01);
   (Continued)

(58) Field of Classification Search
   CPC ............. G05D 1/0214; G05D 1/0088; G05D 2201/0213; B60W 60/0015;
   (Continued)

(56) References Cited

U.S. PATENT DOCUMENTS 10,322,720 B2 * 6/2019 Ohmura ............... B60W 40/04
2005/0228588 A1 * 10/2005 Braeuchle ............ B62D 15/025
                                                    701/301

(Continued)

FOREIGN PATENT DOCUMENTS

JP   H11-348598 A   12/1999
JP   2016-037266 A   3/2016
(Continued)

OTHER PUBLICATIONS

Towards Predictive Driving through Blind Intersections, IEEE (Year: 2018).*
English Translation for WO-2013021489-A1 (Year: 2013).*
Office Action issued in corresponding Japanese Patent Application No. 2020-027464, dated Sep. 26, 2023, w/English Translation.
Notice of Reasons for Refusal received in Japanese Patent Application No. 2020-027464, dated Mar. 5, 2024.

*Primary Examiner* — Rachid Bendidi
*Assistant Examiner* — Moises Gasca Alva
(74) *Attorney, Agent, or Firm* — Rimon P.C.

(57) ABSTRACT

A vehicle driving assist system includes a storage, an autonomous sensor, a traveling environment recognizer, and a controller. The storage contains map information on an intersection where at least one intersecting road intersects at grade with a traveling road of an own vehicle. The autonomous sensor detects information on the traveling road positioned in front of the own vehicle. The traveling environment recognizer recognizes the detected information on the traveling road. The controller determines, before reaching the intersection, whether the intersecting road is a blind spot depending on presence or absence of a view-blocking object, on the basis of the recognized information on the traveling road, and changes, if the intersecting road is determined as being a blind spot, a lateral position shift amount of a course of the own vehicle in a direction away from the intersecting road when the own vehicle passes through the intersection.

1 Claim, 10 Drawing Sheets

(52) U.S. Cl.
CPC ..... *B60W 2552/05* (2020.02); *B60W 2552/53* (2020.02); *B60W 2554/4041* (2020.02); *B60W 2554/804* (2020.02)

(58) Field of Classification Search
CPC ......... B60W 2552/05; B60W 2552/53; B60W 2554/4041; B60W 2554/804; B60W 2520/10; B60W 30/18159; B60W 2554/4048; B60W 30/18163; B60W 60/00272; B60W 2552/10; B60W 2555/60; B60W 30/09
See application file for complete search history.

(56) References Cited

U.S. PATENT DOCUMENTS

| | | | | |
|---|---|---|---|---|
| 2015/0073663 | A1* | 3/2015 | Nilsson | B60W 50/0097 701/41 |
| 2016/0280264 | A1* | 9/2016 | Baek | G01S 13/862 |
| 2017/0236422 | A1 | 8/2017 | Naka et al. | |
| 2017/0274898 | A1* | 9/2017 | Nakamura | G08G 1/165 |
| 2018/0056997 | A1 | 3/2018 | Ohmura et al. | |
| 2019/0082377 | A1* | 3/2019 | Silver | H04W 4/027 |
| 2019/0118804 | A1 | 4/2019 | Toda et al. | |
| 2019/0286147 | A1* | 9/2019 | Matsunaga | B60W 60/0015 |
| 2019/0291728 | A1* | 9/2019 | Shalev-Shwartz | B60W 60/0015 |
| 2020/0247399 | A1 | 8/2020 | Tanahashi et al. | |
| 2021/0009117 | A1 | 1/2021 | Emura | |

FOREIGN PATENT DOCUMENTS

| | | | |
|---|---|---|---|
| JP | 2016-071566 A | 5/2016 | |
| JP | 2018-034709 A | 3/2018 | |
| JP | 2019-077266 A | 5/2019 | |
| JP | 2019-079206 A | 5/2019 | |
| JP | 2019-171893 A | 10/2019 | |
| WO | WO-2013021489 A1 * | 2/2013 | ............... B60T 7/22 |

* cited by examiner

VEHICLE DRIVING ASSIST SYSTEM

CROSS-REFERENCE TO RELATED APPLICATIONS

The present application claims priority from Japanese Patent Application No. 2020-027464 filed on Feb. 20, 2020, the entire contents of which are hereby incorporated by reference.

BACKGROUND

The technology relates to a vehicle driving assist system that assists driving of a vehicle.

In recent years, a driving assist system has been known that includes an autonomous sensor mounted on a vehicle, and detects a traveling environment in front of the own vehicle by the autonomous sensor. By the detection, the driving assist system recognizes a preceding vehicle and various obstacles, and measures a distance between the own vehicle and a target. Known examples of such an autonomous sensor include a stereo camera device including a pair of left and right stereo cameras, and a variety of radar devices.

In regard to the vehicle driving assist system (control), for example, Japanese Unexamined Patent Application Publication (JP-A) No. 2018-34709 discloses a technique of traveling along a course shifted by an offset, assuming that a vehicle enters a traveling lane of the own vehicle from a side road at an intersection.

The technique disclosed in JP-A No. 2018-34709 sets a separation distance for each vehicle speed, assuming the vehicle on the side road, and performs deceleration or shifts the course by an offset in accordance with the separation distance. An offset amount of the course is set on the basis of speed distribution determined depending on a target such as a vehicle or a person. In shifting the course by an offset, the disclosed technique also takes an oncoming vehicle into consideration, and in a case where an oncoming vehicle is present, sets such an offset amount that prevents the own vehicle from straying onto an oncoming lane.

SUMMARY

An aspect of the technology provides a vehicle driving assist system including a storage, an autonomous sensor, a traveling environment recognizer, and a controller. The storage contains map information on an intersection where at least one intersecting road intersects at grade with a traveling road of an own vehicle. The autonomous sensor is configured to detect information on the traveling road positioned in front of the own vehicle. The traveling environment recognizer is configured to recognize the information on the traveling road detected by the autonomous sensor. The controller is configured to determine, at a predetermined point before reaching the intersection, whether the intersecting road is a blind spot depending on presence or absence of a view-blocking object, on the basis of the information on the traveling road recognized by the traveling environment recognizer, and to change, in a case where the intersecting road is determined as being a blind spot, a lateral position shift amount of a course of the own vehicle in a direction away from the intersecting road when the own vehicle passes through the intersection.

An aspect of the technology provides a vehicle driving assist system including a storage, an autonomous sensor, and circuitry. The storage contains map information on an intersection where at least one intersecting road intersects at grade with a traveling road of an own vehicle. The autonomous sensor is configured to detect information on the traveling road positioned in front of the own vehicle. The circuitry is configured to recognize the information on the traveling road detected by the autonomous sensor. The circuitry is further configured to determine, at a predetermined point before reaching the intersection, whether the intersecting road is a blind spot depending on presence or absence of a view-blocking object, on the basis of the recognized information on the traveling road. The circuitry is further configured to change, in a case where the intersecting road is determined as being a blind spot, a lateral position shift amount of a course of the own vehicle in a direction away from the intersecting road when the own vehicle passes through the intersection.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

In a case where, when passing through an intersection, a blind spot is created by a fence, for example, near the intersection, and another vehicle is about to enter the intersection from an intersecting road, a stereo camera device and a radar device can generally be unable to recognize the other vehicle that is about to enter from the intersecting road.

Even if the stereo camera device and the radar device recognize another vehicle entering an intersection, an occupant can feel anxious that a vehicle might come out from an intersecting road.

It is desirable to provide a driving assist system that makes it possible to improve traveling stability and reduce anxiety of an occupant when passing through an intersection where an intersecting road is a blind spot.

In the following, some example embodiments of the disclosure are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, a dimension of each of the elements, a material of each of the elements, a ratio between the elements, relative positional relationship between the elements, and any other specific numerical value are illustrative only for easier understanding and not to be construed as limiting to the technology unless otherwise stated. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description.

Figure 1:
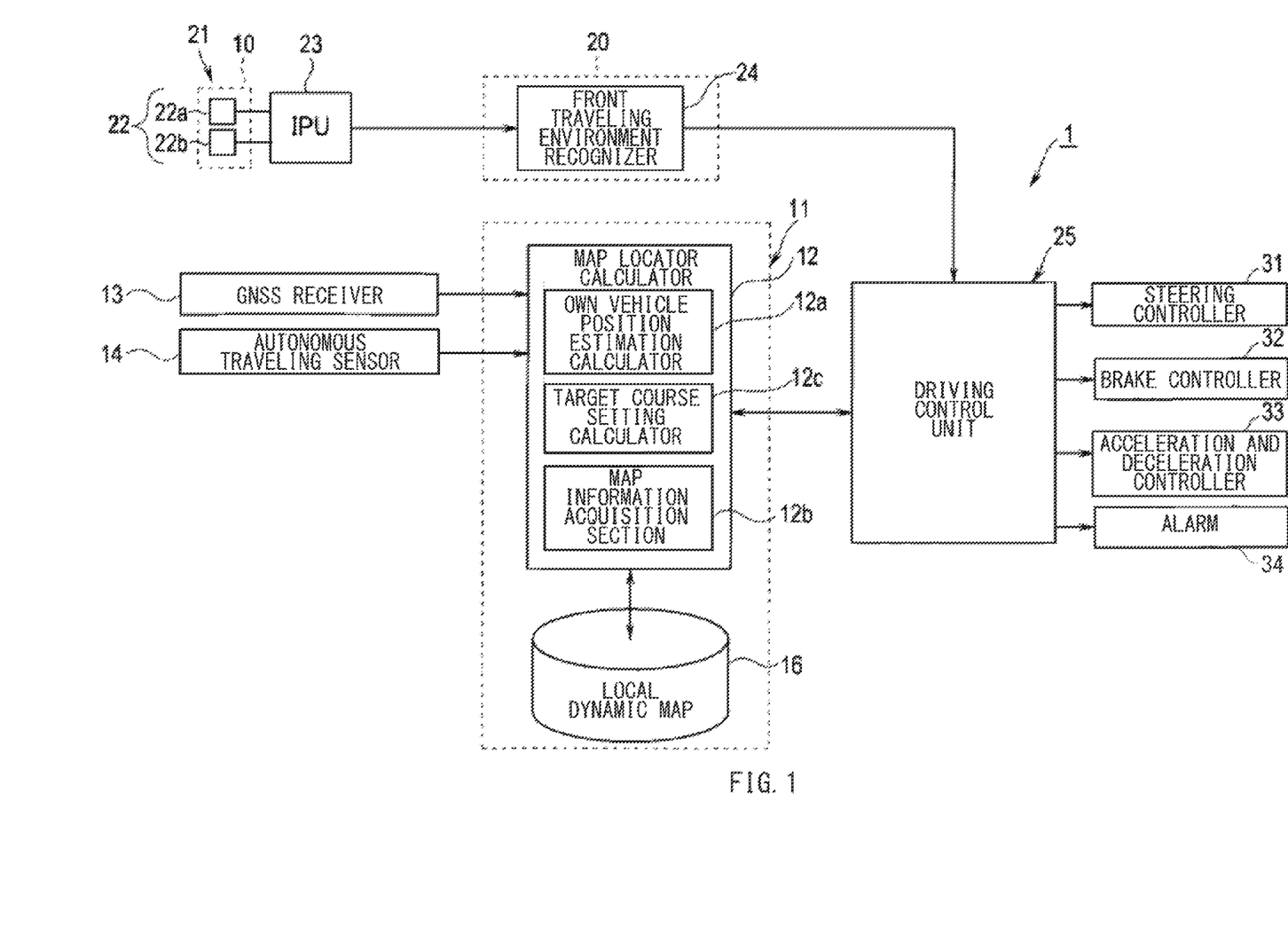
FIG. 1 is a block diagram illustrating a configuration of a vehicle driving assist system.

One example embodiment of the technology will be described on the basis of the drawings. FIG. 1 illustrates a driving assist system 1 mountable on an own vehicle M (see FIG. 2). The driving assist system 1 may include a locator unit 11 and an autonomous sensor unit 22. The locator unit 11 may detect an own vehicle position. The autonomous sensor unit 22 may serve as an autonomous detector including a stereo camera device 21 that recognizes a traveling environment in front of the own vehicle M.

The locator unit 11 and the autonomous sensor unit 22 may configure a redundant system that, in a case where a malfunction occurs in one unit, temporarily causes the other unit to continue driving assist. The driving assist system 1 may constantly monitor whether a shape of a road on which the own vehicle M is currently traveling is the same between the locator unit 11 and the autonomous sensor unit 22, and cause the driving assist to be continued in a case where the road shape is the same.

The locator unit 11 may estimate a position of the own vehicle M (own vehicle position) on a road map, and acquire road map data in front of the own vehicle position. The stereo camera device 21 of the autonomous sensor unit 22 may obtain a road curvature at the middle between lane lines that define the left and the right of a traveling lane of the own vehicle M. The stereo camera device 21 may also detect lateral position deviation in a vehicle width direction of the own vehicle M with reference to the middle between the left and right lane lines.

The stereo camera device 21 may also recognize a preceding vehicle in front of the own vehicle M, three-dimensional objects including a mobile body, such as a pedestrian or a two-wheeled vehicle, that is about to cross the road right in front of the own vehicle M, a signal phase (lighting color), and a road sign, for example. Examples of the two-wheeled vehicle may include a bicycle and a motorcycle.

The locator unit 11 may include a map locator calculator 12 and a high-precision road map database 16. In one embodiment, the high-precision road map database 16 may serve as a "storage". The map locator calculator 12, a front traveling environment recognizer 24, and a driving control unit 25 may include a known microcomputer including a central processing unit (CPU), a random access memory (RAM), a read only memory (ROM), and a nonvolatile storage, for example, and peripheral equipment thereof. The ROM may store, in advance, fixed data such as a program to be executed by the CPU or a data table, for example. The front traveling environment recognizer 24 and the driving control unit 25 will be described later.

To the input side of the map locator calculator 12, a global navigation satellite system (GNSS) receiver 13 and an autonomous traveling sensor 14 may be coupled to be able to communicate with the map locator calculator 12.

The GNSS receiver 13 may receive positioning signals transmitted from a plurality of positioning satellites. The autonomous traveling sensor 14 may be configured to enable autonomous traveling in an environment where receiving sensitivity from the GNSS satellites is low and effective positioning signals are not receivable, such as traveling in a tunnel. The autonomous traveling sensor 14 may include a vehicle speed sensor, a yaw rate sensor, and a longitudinal acceleration sensor, for example.

For example, the map locator calculator 12 may perform localization based on a movement distance and an azimuth, on the basis of a vehicle speed detected by the vehicle speed sensor, a yaw rate (yaw angular velocity) detected by the yaw rate sensor, and a longitudinal acceleration detected by the longitudinal acceleration sensor, for example.

The map locator calculator 12 may include an own vehicle position estimation calculator 12a, a map information acquisition section 12b, and a target course setting calculator 12c. The own vehicle position estimation calculator 12a may be configured to estimate the own vehicle position. The map information acquisition section 12b may map-match the estimated own vehicle position on the road map to identify a current location of the own vehicle M, and acquire road map information including information on a surrounding environment of the current location. The target course setting calculator 12c may set a course (target course) along which the own vehicle M is to travel.

The high-precision road map database 16 may be a large-capacity storage medium such as an HDD, and may store known road map information (local dynamic map) with high precision. The high-precision road map information may have a hierarchical structure in which additional map information to be used to support automatic traveling is superimposed on a static information level at the lowest level serving as a foundation.

The map information acquisition section 12b described above may acquire the current location and road map information in front of the own vehicle M, from the road map information stored in the high-precision road map database 16. The road map information may include surrounding environment information. The surrounding environment information may include static position information such as a road type, a road shape, left and right lane lines, a road sign, a stop line, an intersection, or traffic lights. Examples of the road type may include an ordinary road and an expressway. The surrounding environment information may also include dynamic position information such as traffic congestion information or traffic regulation attributed to an accident or construction work.

On the basis of a destination set by a driver for automatic driving, for example, the map information acquisition section 12b may acquire, from the road map information, route map information to the destination from the own vehicle position (current location) estimated by the own vehicle position estimation calculator 12a described above. The map information acquisition section 12b may transmit the acquired route map information (lane data on a route map and peripheral information thereof) to the own vehicle position estimation calculator 12a.

The own vehicle position estimation calculator 12a may acquire position coordinates of the own vehicle M on the basis of the positioning signals received by the GNSS receiver 13, and map-match the position coordinates on the route map information to estimate the own vehicle position (current location) on the road map and identify the traveling lane. The own vehicle position estimation calculator 12a may acquire the road shape of the traveling lane stored in the route map information, and cause the road shape to be stored sequentially.

Furthermore, in an environment where effective positioning signals from the positioning satellites are unable to be received due to a decrease in the sensitivity of the GNSS receiver 13, such as traveling in a tunnel, the own vehicle position estimation calculator 12a may switch to autonomous navigation, and perform localization by using the autonomous traveling sensor 14.

The target course setting calculator 12c may first set the target course that causes the own vehicle M to perform the automatic traveling along lane lines, with reference to the current position map-matched by the map information acquisition section 12b. In a case where the driver has inputted the destination, the target course may be set along a traveling route coupling the current location and the destination.

The target course may be set in front of the own vehicle M, up to several hundreds of meters to several kilometers ahead, and may be updated sequentially during the traveling. The target course set by the target course setting calculator 12c may be read by the driving control unit 25 serving as an automatic driving controller. In one embodiment, the driving control unit 25 may serve as a "controller".

On the other hand, the stereo camera device 21 may include first and second cameras 22a and 22b, an image processing unit (IPU) 23, and the front traveling environment recognizer 24. The first and second cameras 22a and 22b may be imaging units that capture images of a space in front of the own vehicle M. In one embodiment, the first and second cameras 22a and 22b may serve as an "autonomous sensor". In one embodiment, the front traveling environment recognizer 24 may serve as a "traveling environment recognizer".

Figure 2:
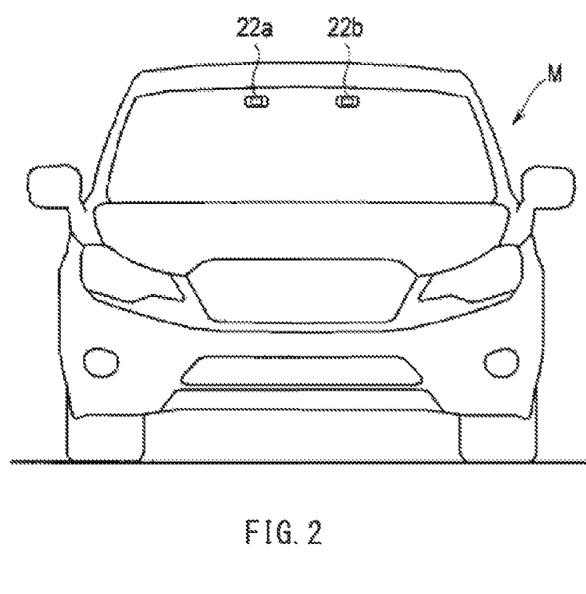
FIG. 2 is a front view of a vehicle equipped with a stereo camera device.

As illustrated in FIG. 2, the first and second cameras 22a and 22b may be fixed side by side in a lateral direction at an upper part close to a windshield provided in a front part of a vehicle compartment of the own vehicle M.

A plurality of images captured by the first and second cameras 22a and 22b may be subjected to predetermined image processing by the IPU 23 to be outputted to the front traveling environment recognizer 24.

The front traveling environment recognizer 24 may recognize, on the basis of a stereo image, the road shape of the course along which the own vehicle M travels (own vehicle course), presence or absence of a preceding vehicle traveling in front of the own vehicle M, three-dimensional objects including a mobile body, such as a pedestrian or a two-wheeled vehicle, that is about to cross the road right in front of the own vehicle M, a signal phase (lighting color), and a road sign, for example. Examples of the two-wheeled vehicle may include a bicycle and a motorcycle.

On the basis of focal lengths of the cameras, a baseline length between the cameras, and parallax for the same target, the front traveling environment recognizer 24 may calculate a distance to the target by using the principle of triangulation. It is to be noted that methods of recognizing a target and obtaining the distance to the target on the basis of the stereo image are already known techniques, and therefore detailed description will be omitted here.

In the example embodiment, the first and second cameras 22a and 22b may configure an autonomous sensor section 10 serving as a detector that detects traveling road information, and the front traveling environment recognizer 24 may configure a traveling environment recognition section 20 serving as a traveling environment recognizer.

In addition to the stereo camera device 21, a radar device may be provided. The radar device may include an autonomous sensor serving as any of a variety of radar detectors of a sensing device, such as a millimeter-wave radar, a laser radar, or a light detection and ranging (LIDAR).

The own vehicle M including an autonomous sensor may be provided with a surrounding traveling environment recognizer that recognizes surrounding environment information such as a mobile body present around the own vehicle M, and a signal from the autonomous sensor may be inputted to the surrounding traveling environment recognizer.

To the input side of the driving control unit 25, the target course setting calculator 12c of the map locator calculator 12 and the front traveling environment recognizer 24 of the stereo camera device 21 may be coupled to be able to communicate with the driving control unit 25. In a case where a radar device is provided, the surrounding traveling environment recognizer may be coupled to the driving control unit 25 to be able to communicate with the driving control unit 25. It is to be noted that, without being limited to physical contact, electrical and/or radio connection may be established, for example, as long as communication is able to be performed.

To the output side of the driving control unit 25, a steering controller 31, a brake controller 32, an acceleration and deceleration controller 33, and an alarm 34 may be coupled to be able to communicate with the driving control unit 25. The steering controller 31 may cause the own vehicle M to travel along the target course. The brake controller 32 may cause the own vehicle M to decelerate by forced braking. The acceleration and deceleration controller 33 may control the vehicle speed of the own vehicle M.

The driving control unit 25 may control the steering controller 31, the brake controller 32, and the acceleration and deceleration controller 33 in a predetermined manner to cause, on the basis of the positioning signals indicating the own vehicle position received by the GNSS receiver 13, the own vehicle M to perform the automatic traveling along the target course on the road map set by the target course setting calculator 12c.

In the control, the driving control unit 25 may perform known adaptive cruise control (ACC) and active lane keeping (ALK), on the basis of the front traveling environment recognized by the front traveling environment recognizer 24. In a case where a preceding vehicle is detected, the driving control unit 25 may cause the own vehicle M to follow the preceding vehicle. In a case where no preceding vehicle is detected, the driving control unit 25 may cause the own vehicle M to travel within a speed limit. Furthermore, in a case where a mobile body that is about to cross the road right in front of the own vehicle M is detected, the driving control unit 25 may activate the brake controller 32 to stop the own vehicle M.

Detailed description will be given on a control example to be executed by the own vehicle M when passing through an intersection in performing the automatic traveling or the adaptive cruise control and the active lane keeping. The following description will be given using an intersection of a T-junction where an intersecting road intersects at grade, on the left side, with a traveling road of the own vehicle M.

First, control of setting the target course of the own vehicle M will be described briefly.

Figure 3:
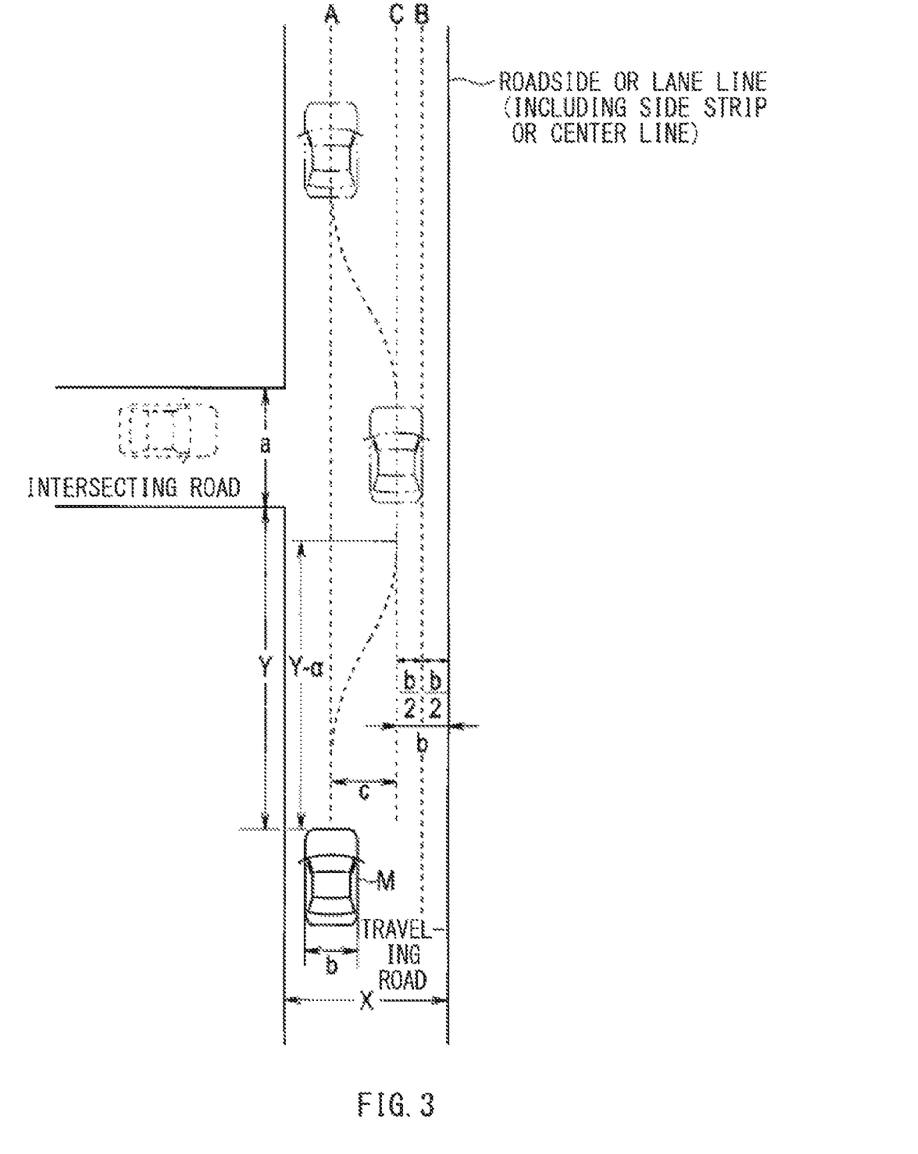
FIG. 3 is a diagram illustrating setting of a target course of the own vehicle when passing through an intersection.

As illustrated in FIG. 3, the driving control unit 25 of the own vehicle M may, upon recognition of the intersection in front of the own vehicle M on the basis of the information of the autonomous sensor section 10 and the road map data, acquire a predetermined longitudinal distance Y (m), a road width a (m) of the intersecting road, and a road width X (m) of the traveling road of the own vehicle M, for example, based on the vehicle speed of the own vehicle M and the information of the autonomous sensor section 10 and the road map data. The longitudinal distance Y (m) may indicate a distance to a point where the own vehicle M reaches an entrance of the intersection.

On the basis of the information acquired by the driving control unit 25, the target course setting calculator 12c may calculate a virtual target course B. The target course B may be positioned at half b/2 (m) of a vehicle width b (m), as a margin, from a right roadside or lane line (including a side strip or a center line) of the traveling road in a direction away from the intersecting road. The target course setting calculator 12c may calculate a target course C shifted from the target course B toward the middle of the road by the half b/2 (m) of the vehicle width b (m).

In this case, the target course setting calculator 12c may calculate a lateral position shift amount (offset amount) to set a route to a corrected distance Y—α (m), assuming c (m) as a lateral distance by which the middle of the own vehicle M moves to the target course C. The lateral position shift amount may be calculated, on the basis of a lateral acceleration corresponding to the vehicle speed of the own vehicle M, by integrating the lateral acceleration to set a yaw angle. The corrected distance Y—α (m) may be obtained by subtracting a predetermined distance α (m) from the predetermined longitudinal distance Y (m) to the entrance of the intersection. The predetermined distance α may be set to any distance of about 1 (m), for example.

To cause the middle of the own vehicle M to move to the target course C when passing through the intersection, the target course setting calculator 12c may correct the lateral acceleration to enable smooth lateral movement, and determine conformity to laws and regulations. The target course setting calculator 12c may thus set a route of moving from a target course A to the target course C. On the basis of the route, the own vehicle M may be steered under the control of the steering controller 31.

After passing across the road width a (m) on the intersecting road side, control may be performed to cause the own vehicle M to move to, from the target course C, and travel along the original target course A.

Description will now be given on a control example to be executed by the own vehicle M when passing through an intersection in performing the automatic traveling. It is to be noted that similar control may be performed also in performing the adaptive cruise control and the active lane keeping.

Figure 4:
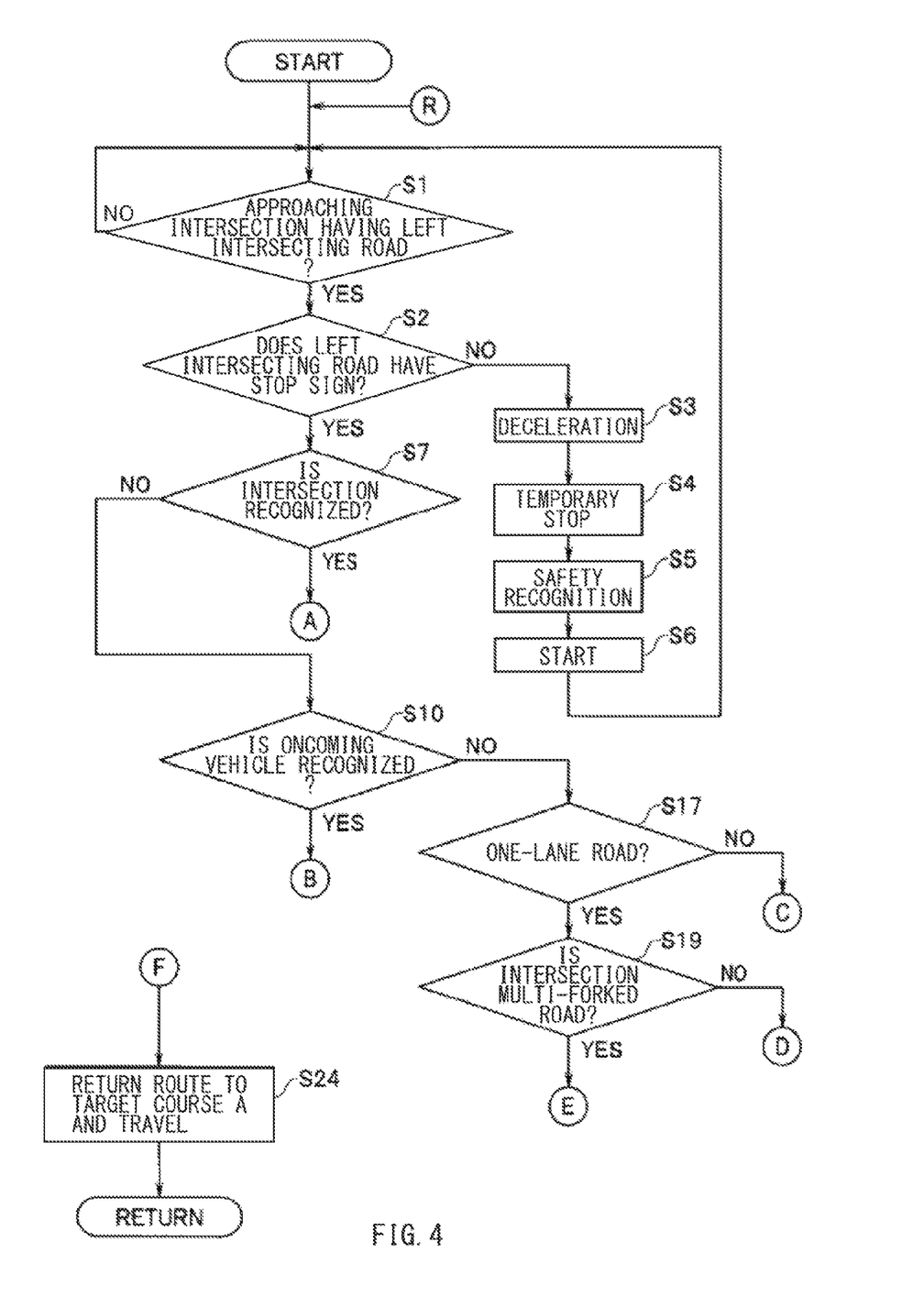
FIG. 4 is a flowchart illustrating a control example to be executed when passing through an intersection.

As illustrated in a flowchart of FIG. 4, the driving control unit 25 of the own vehicle M may determine whether the own vehicle M is approaching the intersection on the basis of the information of the autonomous sensor section 10 and the road map data (S1). This routine of step S1 may be repeatedly executed until an approach to the intersection is recognized.

If the own vehicle M approaches the intersection (S1: YES), the driving control unit 25 may determine, on the basis of the information of the autonomous sensor section 10 and the road map data, whether the road type of the traveling road of the own vehicle is of higher priority than the left intersecting road, depending on presence or absence of a stop sign on the left intersecting road (S2). In a case where the traveling road is not a priority road (S2: NO), the driving control unit 25 may cause the own vehicle M to decelerate (S3), activate the brake controller 32 to cause the own vehicle M to make a temporary stop in accordance with a stop line before the intersection (S4), and perform safety recognition (S5). If safety is recognized, the driving control unit 25 may cause the own vehicle M to make a start (S6) to enter the intersection and continue the automatic traveling. Thereafter, the process may return to step S1.

In the safety recognition of step S5, the driving control unit 25 may, on the basis of the information of the traveling environment recognition section 20, cause the own vehicle M to make a temporary stop before the intersection until a mobile body, such as another vehicle, a bicycle, or a pedestrian, traveling on the priority road is no longer detected, and thereafter give permission to cause the own vehicle M to make a start in step S6.

Upon determining that the road type of the traveling road is of higher priority on the basis of the information of the autonomous sensor section 10 and the road map data (S2: YES), the driving control unit 25 may determine whether the intersection is recognized on the basis of the information of the traveling environment recognition section 20 (S7). In the intersection recognition determination of step S7, the driving control unit 25 may determine whether the intersection is a clearly visible intersection without a view-blocking object 100, such as a building, a wall, or a tree, on the basis of the information of the traveling environment recognition section 20. The "clearly visible intersection" may refer to, for example, a situation in which it is possible to recognize several meters of the intersecting road, for example, a range including a stop line on the intersecting road, from a distance of about 10 m before the intersection.

Upon recognizing the intersection on the basis of the information of the traveling environment recognition section 20, in other words, determining that the intersection is a clearly visible intersection where the intersecting road is detectable by the autonomous sensor section 10 (S7: YES), the driving control unit 25 may, as illustrated in a flowchart of FIG. 5, determine whether another vehicle is stopped or approaching on the intersecting road, on the basis of the information of the traveling environment recognition section 20 (S8).

Figure 5:
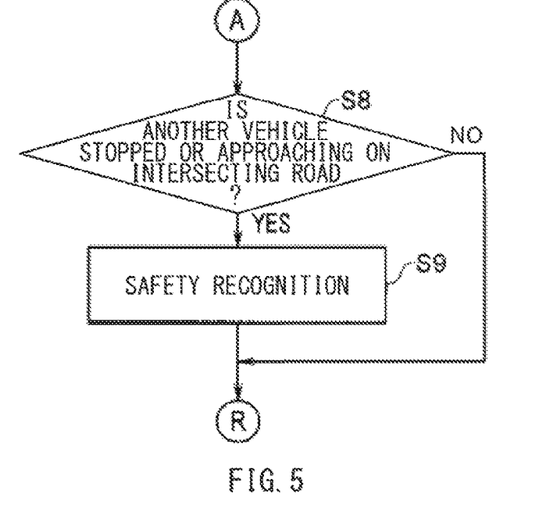
FIG. 5 is a flowchart illustrating a control example to be executed when an intersection is recognized.

Upon determining that another vehicle is stopped or approaching on the intersecting road on the basis of the information of the traveling environment recognition section 20 (S8: YES), the driving control unit 25 may perform safety recognition (S9), and cause the process to return to step S1. In the safety recognition of step S9, in a case where a mobile body, such as another vehicle, a bicycle, or a pedestrian, stopped or approaching is detected on the intersecting road on the basis of the information of the traveling environment recognition section 20, the driving control unit 25 may attract the driver's attention by outputting sound, or displaying a warning on an instrument panel or a navigation monitor, for example, continue the automatic traveling at a predetermined legal speed, and cause the process to return to step S1.

Upon determining that no other vehicle is stopped or approaching on the intersecting road on the basis of the information of the traveling environment recognition section 20 (S8: NO), the driving control unit 25 may continue the automatic traveling, and cause the process to return to step S1.

Upon determining that the intersection is not recognizable on the basis of the information of the traveling environment recognition section 20, in other words, the intersection is a not clearly visible intersection where the autonomous sensor section 10 is not able to detect the intersecting road due to the view-blocking object 100, such as a building or a wall (S7: NO), the driving control unit 25 may determine whether an oncoming vehicle is recognized (S10). In step S10, the driving control unit 25 may calculate whether the own vehicle M passes an oncoming vehicle when entering the intersection, on the basis of a relative speed based on the vehicle speed of the own vehicle M and a vehicle speed of the oncoming vehicle.

Upon recognizing an oncoming vehicle on the basis of the information of the traveling environment recognition section 20 (S10: YES), the driving control unit 25 may, as illustrated in a flowchart of FIG. 6, recognize the number of lanes (lane lines), for example, of the traveling road on the basis of the information of the road map data to determine whether the traveling road is a one-lane road (S11).

Figure 7:
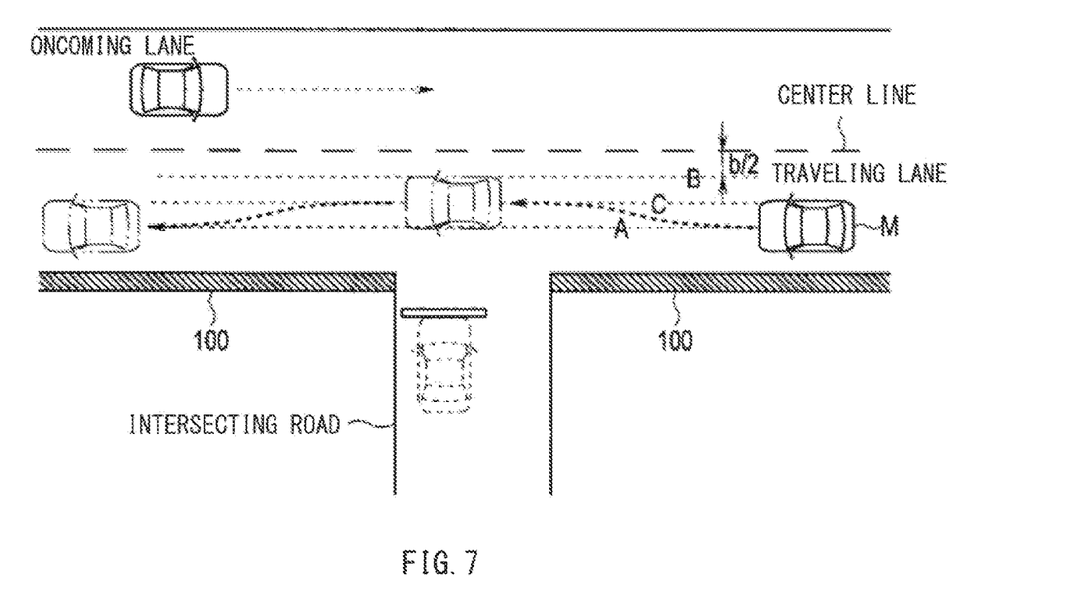
FIG. 7 is a diagram illustrating a target course of the own vehicle when passing through an intersection of a two-lane road on which an oncoming vehicle is present.

Upon determining that the traveling road is not a one-lane road on the basis of the information of the autonomous sensor section 10 and the road map data (S11: NO), the driving control unit 25 may, as illustrated in FIG. 7, change the route from the target course A to the target course C (S12). The target course C may be set to bring the own vehicle M closer to a lane line in the middle of the road (here, the center line) away from the intersecting road, providing a margin of the half b/2 (m) of the vehicle width b (m). After the own vehicle M passes through the intersection, the driving control unit 25 may, as illustrated in the flowchart of FIG. 4, return the route to the target course A (S24), and cause the process to return to step S1.

Figure 6:
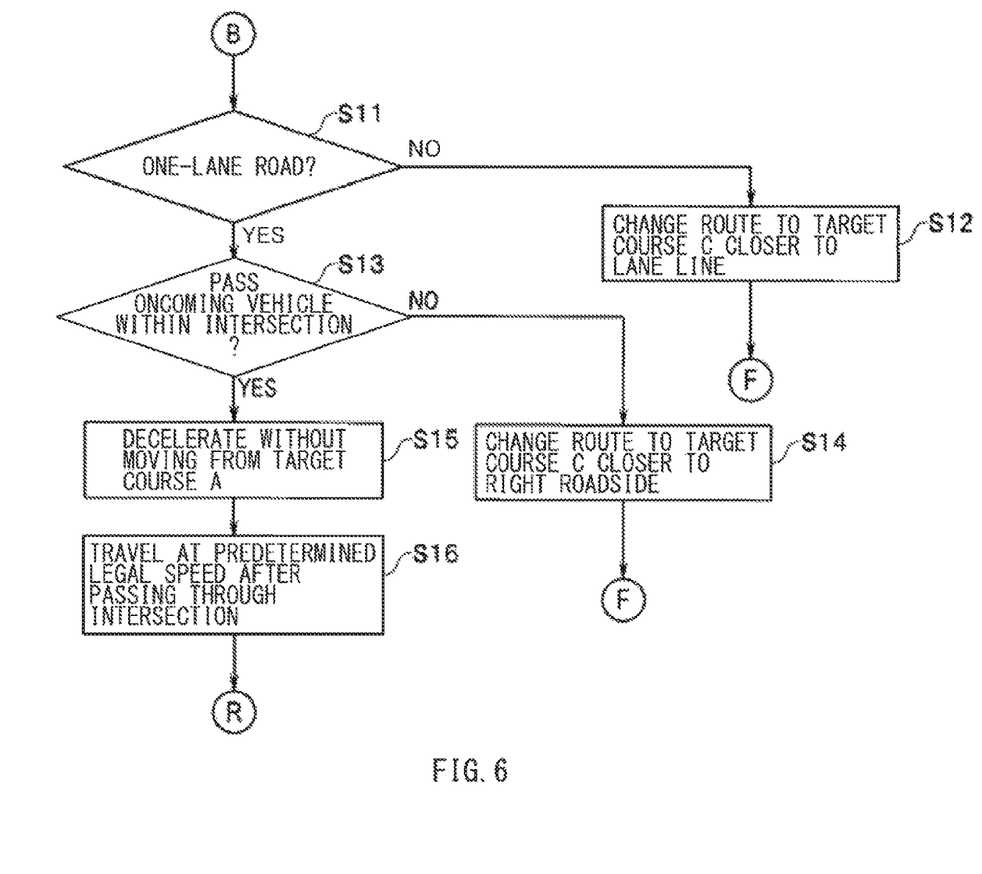
FIG. 6 is a flowchart illustrating a control example to be executed in a case where an intersection is made a blind spot by a view-blocking object.

Upon determining that the traveling road is a one-lane road on the basis of the information of the autonomous sensor section 10 and the road map data (S11: YES), the driving control unit 25 may determine whether the own vehicle M passes an oncoming vehicle when entering the intersection, by calculation from the relative speed based on the vehicle speed of the own vehicle M and the vehicle speed of the oncoming vehicle (S13).

Figure 8:
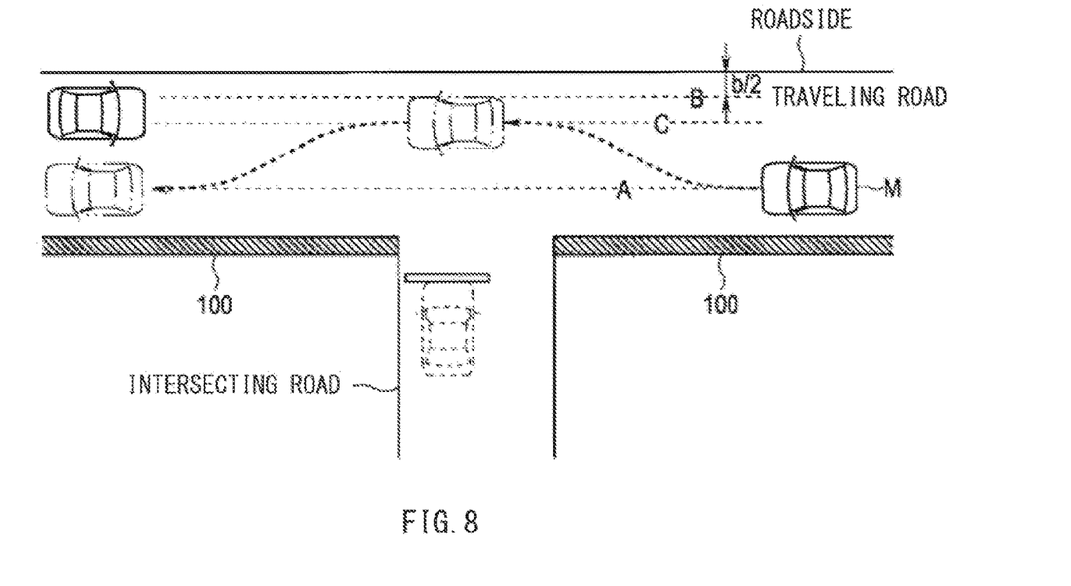
FIG. 8 is a diagram illustrating a target course of the own vehicle when passing through an intersection of a one-lane road in a case where the own vehicle does not pass an oncoming vehicle within the intersection.

Upon determining that the own vehicle M and an oncoming vehicle do not pass each other within the intersection (S13: NO), the driving control unit 25 may, as illustrated in FIG. 8, change the route from the target course A to the target course C (S14). The target course C may be set to bring the own vehicle M closer to the right roadside away from the intersecting road, providing a margin of the half b/2 (m) of the vehicle width b (m) from the right roadside. After the own vehicle M passes through the intersection, the driving control unit 25 may, as illustrated in the flowchart of FIG. 4, return the route to the target course A (S24), and cause the process to return to step S1.

A situation in which the own vehicle M and an oncoming vehicle do not pass each other within the intersection may be a case where a distance between the own vehicle M and the oncoming vehicle is sufficient even if the own vehicle M passes through the intersection and returns to the target course A, or a case where the own vehicle M starts movement to the target course C after the oncoming vehicle passes the own vehicle M.

Figure 9:
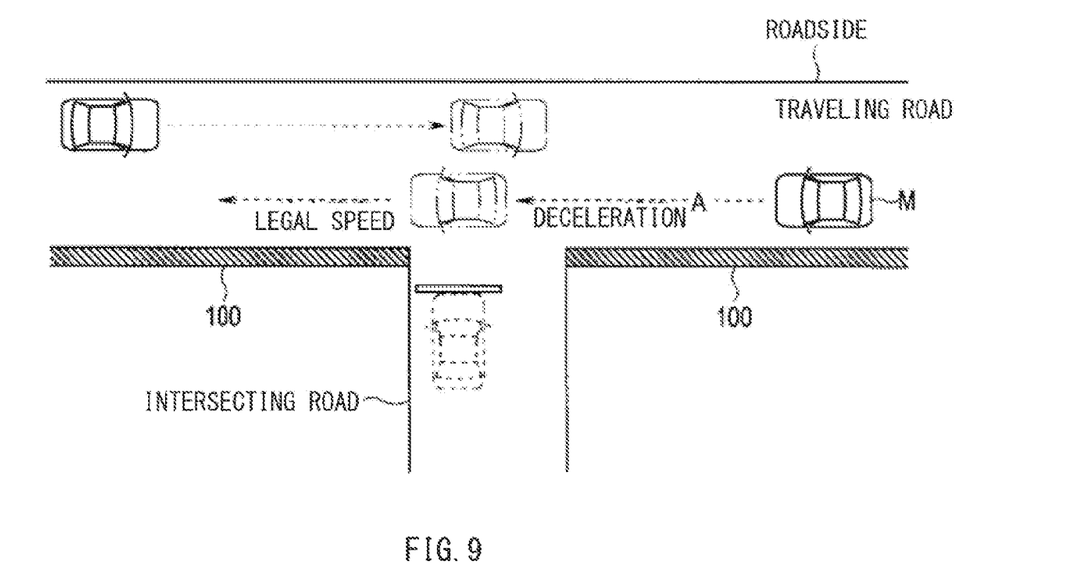
FIG. 9 is a diagram illustrating a target course of the own vehicle when passing through an intersection of a one-lane road in a case where the own vehicle passes an oncoming vehicle within the intersection.

Upon determining that the own vehicle M and an oncoming vehicle pass each other within the intersection (S13: YES), the driving control unit 25 may, as illustrated in FIG. 9, cause the own vehicle M to decelerate and travel without moving from the target course A (S15). After the own vehicle M passes through the intersection, the driving control unit 25 may return the vehicle speed to the predetermined legal speed (S16), and cause the process to return to step S1.

Figure 10:
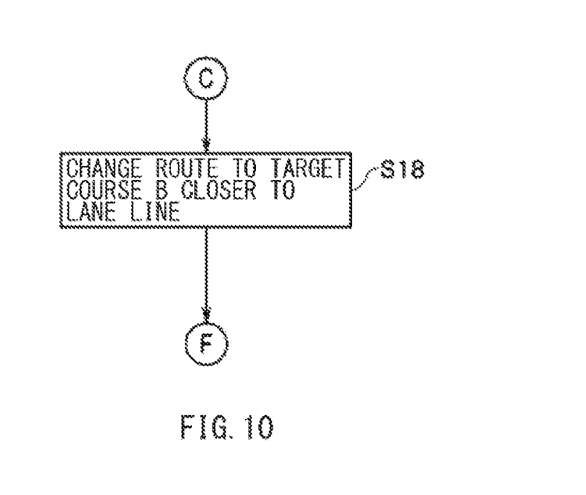
FIG. 10 is a flowchart illustrating a control example to be executed when passing through an intersection of a two-lane road on which no oncoming vehicle is present.
Figure 11:
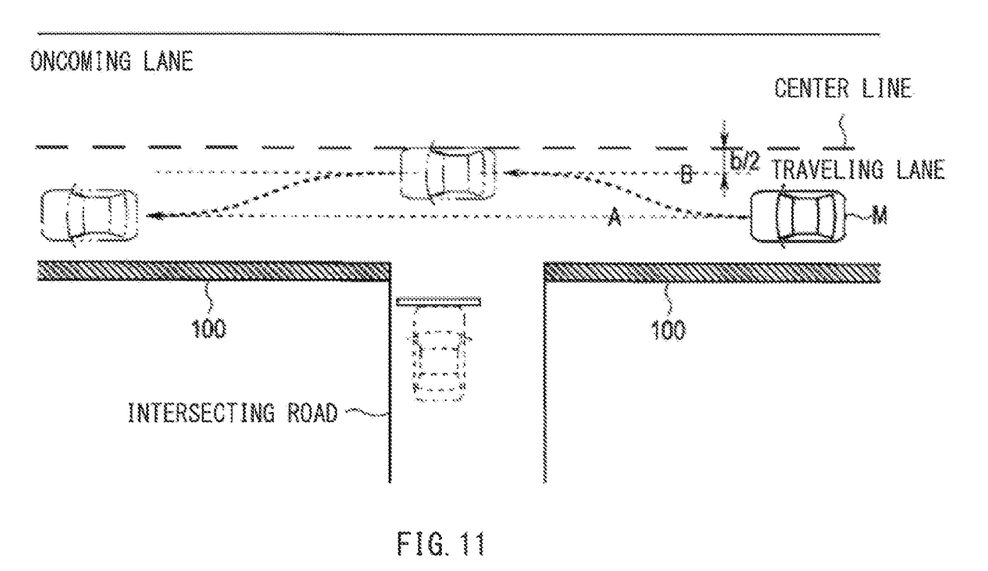
FIG. 11 is a diagram illustrating a target course of the own vehicle when passing through an intersection of a two-lane road on which no oncoming vehicle is present.

Also in a case where no oncoming vehicle is recognized on the basis of the information of the traveling environment recognition section 20 in step S10 (S10: NO), the driving control unit 25 may recognize the number of lanes (lane lines), for example, of the traveling road on the basis of the information of the autonomous sensor section 10 and the road map data to determine whether the traveling road is a one-lane road (S17). Upon determining that the traveling road is not a one-lane road on the basis of the information of the autonomous sensor section 10 and the road map data (S17: NO), the driving control unit 25 may, as illustrated in a flowchart of FIG. 10 and FIG. 11, change the route from the target course A to the target course B (S18). The target course B may be set to bring the own vehicle M closer to a lane line in the middle of the road (here, the center line) away from the intersecting road, without a margin, at the half b/2 (m) of the vehicle width b (m) from the lane line. After the own vehicle M passes through the intersection, the driving control unit 25 may, as illustrated in the flowchart of FIG. 4, return the route to the target course A (S24), and cause the process to return to step S1.

Upon determining that the traveling road is a one-lane road on the basis of the information of the autonomous sensor section 10 and the road map data (S17: YES), the driving control unit 25 may, as illustrated in the flowchart of FIG. 4, determine whether the intersection is a multi-forked road (S19). Exemplified here as the intersection is a four-forked road, which is a crossroads.

Figure 12:
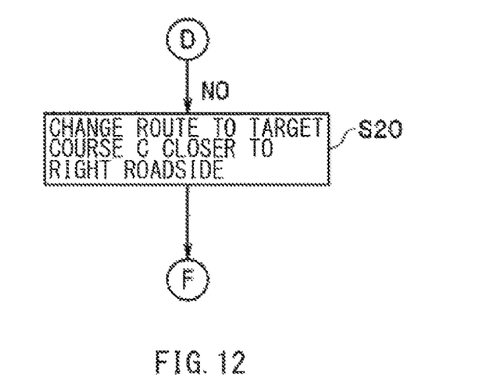
FIG. 12 is a flowchart illustrating a control example to be executed when passing through an intersection of a T-junction of a one-lane road on which no oncoming vehicle is present.
Figure 13:
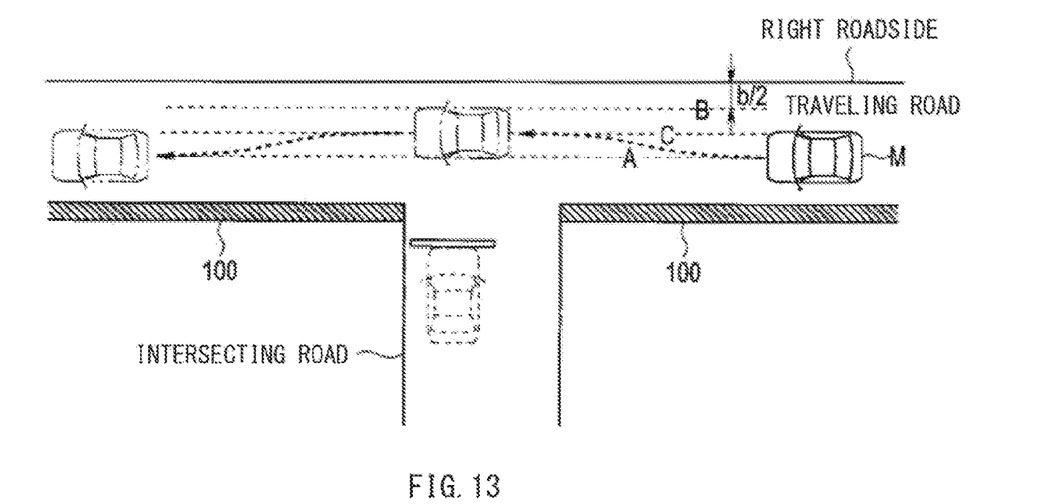
FIG. 13 is a diagram illustrating a target course of the own vehicle when passing through an intersection of a T-junction of a one-lane road on which no oncoming vehicle is present.

Upon determining that the intersection is not a multi-forked road on the basis of the information of the autonomous sensor section 10 and the road map data (S19: NO), the driving control unit 25 may, as illustrated in a flowchart of FIG. 12 and FIG. 13, change the route from the target course A to the target course C (S20). The target course C may be set to bring the own vehicle M closer to the right roadside away from the intersecting road, providing a margin of the half b/2 (m) of the vehicle width b (m) from the right roadside. After the own vehicle M passes through the intersection, the driving control unit 25 may, as illustrated in the flowchart of FIG. 4, return the route to the target course A (S24), and cause the process to return to step S1.

Upon determining that the intersection is a multi-forked road on the basis of the information of the autonomous sensor section 10 and the road map data (S19: YES), the driving control unit 25 may, as illustrated in a flowchart of FIG. 14, determine whether a right intersecting road has a stop sign on the basis of the information of the road map data (S21).

Figure 14:
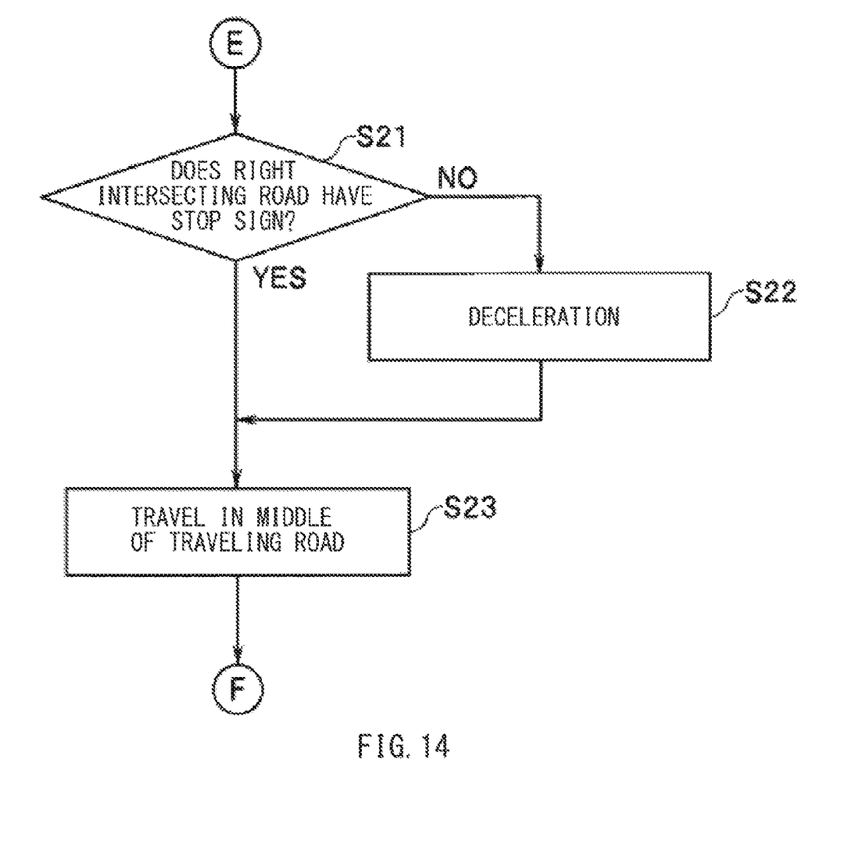
FIG. 14 is a flowchart illustrating a control example to be executed when passing through an intersection of a crossroads of a one-lane road on which no oncoming vehicle is present.
Figure 15:
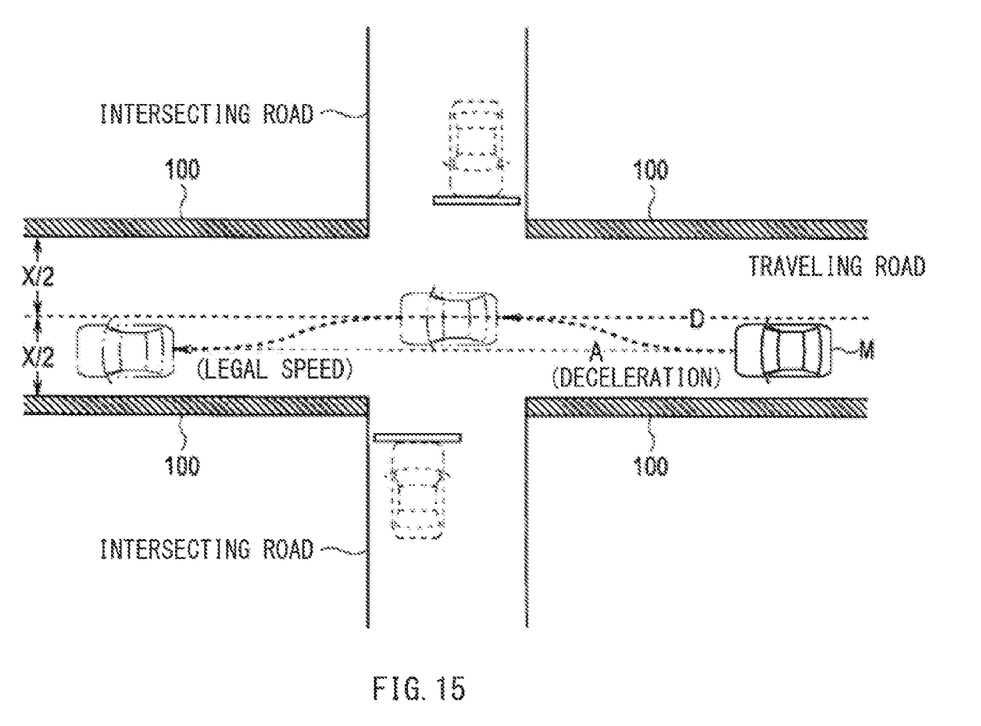
FIG. 15 is a diagram illustrating a target course of the own vehicle when passing through an intersection of a crossroads of a one-lane road on which no oncoming vehicle is present.

In a case where the right intersecting road does not have a stop sign (S21: NO), the driving control unit 25 may cause the own vehicle M to decelerate (S22), regardless of presence or absence of another vehicle, and change the route of the own vehicle M from the target course A to a target course D in the middle of the traveling road (S23). In a case where the right intersecting road has a stop sign (S21: YES), the driving control unit 25 may change the route of the own vehicle M from the target course A to the target course D in the middle of the traveling road, without deceleration (S23).

After the own vehicle M passes through the intersection, the driving control unit may, as illustrated in the flowchart of FIG. 4, return the route to the target course A (S24), and cause the process to return to step S1.

As described above, the vehicle driving assist system according to the example embodiment may, in executing the automatic driving control or the adaptive cruise control and the active lane keeping, determine whether an intersection where an intersecting road intersects at grade on the left side is a not clearly visible intersection having a blind spot due to the view-blocking object 100, such as a building, a wall, or a tree. When passing through the not clearly visible intersection, the vehicle driving assist system may execute control of shifting a lateral position of the course of the own vehicle M in a direction toward a right roadside or a lane line in the middle of the road. Furthermore, the vehicle driving assist system according to the example embodiment may execute control of causing the own vehicle M to decelerate or change the lateral position shift amount of its course in passing through the intersection, depending on the road type, such as a one-lane road or a two-lane road, and presence or absence of an oncoming vehicle and its relative vehicle speed with respect to the own vehicle M.

Such a configuration enables the vehicle driving assist system to improve traveling stability and reduce anxiety of an occupant when passing through an intersection where an intersecting road is a blind spot.

In some embodiments, when passing through an intersection, in a case where another intersection is present at a predetermined distance (about 100 m) on the basis of the information of the road map data, the vehicle driving assist system may execute control of continuing the traveling while keeping the lateral position shift amount of the own vehicle M.

In some embodiments, in executing the adaptive cruise control, in a case where a preceding vehicle makes a lateral position shift toward the middle of the road, the vehicle driving assist system may perform control of following the preceding vehicle. In this case, a direction indicator of the preceding vehicle may be detected, and in a case where the preceding vehicle makes a right or left turn to move to the middle or the outside of the road, the vehicle driving assist system may execute control of preventing the own vehicle M from following the preceding vehicle.

In some embodiments, the vehicle driving assist system may, in a case of not shifting the lateral position of the own vehicle M when passing through an intersection, due to passing an oncoming vehicle, for example, apply preload to a braking device to increase a speed of response of emergency braking. This makes it possible to avoid contact even if another vehicle runs out slightly from an intersecting road.

The driving control unit 25 may include a processor including a CPU and a storage device such as a ROM or a RAM, for example. All or a part of configurations of a plurality of circuits of the processor may be executed by software. For example, various programs corresponding to respective functions and stored in the ROM may be read and executed by the CPU.

All or a part of functions of the processor may be configured by a logic circuit or an analog circuit. Processing of various programs may be implemented by an electronic circuit such as a FPGA.

The example embodiment described above explains an example of the vehicle driving assist system in a case where the own vehicle travels on a road where drivers keep to the left by law. Needless to say, if the vehicle driving assist system is to be applied to a road where drivers keep to the right by law, left and right settings or the like may be appropriately set in an opposite manner.

It is to be noted that the own vehicle includes a vehicle that receives assistance from the vehicle driving assist system, and the vehicle driving assist system may be separately provided. The information such as position information of the own vehicle may be obtained from a mobile phone.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof. Furthermore, the example embodiments described above may include embodiments of the technology in a variety of phases, and a variety of embodiments of the technology may be extracted by appropriate combinations among the disclosed elements.

For example, in a case where example effects described above are achievable even if one or more elements are omitted from the elements described in the example embodiments, a configuration excluding the one or more elements may be extracted as an embodiment of the technology.

Each of the map locator calculator 12, the front traveling environment recognizer 24, and the driving control unit 25 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the map locator calculator 12, the front traveling environment recognizer 24, and the driving control unit 25. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the map locator calculator 12, the front traveling environment recognizer 24, and the driving control unit 25 illustrated in FIG. 1.

The invention claimed is:

1. A vehicle driving assist system comprising:
a storage containing map information on an intersection where at least one intersecting road intersects at grade with a traveling road of an own vehicle;
an autonomous sensor configured to detect information on the traveling road positioned in front of the own vehicle; and
circuitry configured to:
recognize the information on the traveling road detected by the autonomous sensor;
determine, at a predetermined point before reaching the intersection, based on the recognized information on the traveling road, i) whether the intersecting road is a blind spot depending on presence or absence of a view-blocking object, ii) whether an oncoming vehicle is present, and iii) whether the traveling road of the own vehicle is a one-lane road that permits two-way travel and allows vehicles to pass one another, the oncoming vehicle being a vehicle traveling in an opposite direction from the own vehicle on the traveling road of the own vehicle and passing the own vehicle in the intersection;
in response to determining that the intersecting road is not the blind spot, set a lateral position of a course of the own vehicle through the intersection to a first position, the first position being same as a current lateral position in the traveling road of the own vehicle at the predetermined point;
in response to i) determining that the intersecting road is the blind spot, ii) determining that the oncoming vehicle is present, and iii) determining that the traveling road of the own vehicle is the one-lane road, set the lateral position to the first position;
in response to i) the determining that the intersecting road is the blind spot, ii) the determining that the oncoming vehicle is present, and iii) determining that the traveling road of the own vehicle is not the one-lane road, set the lateral position to a second position in a traveling lane in which the own vehicle is traveling;
in response to i) the determining that the intersecting road is the blind spot, ii) the determining that the oncoming vehicle is not present, and iii) the determining that the traveling road of the own vehicle is not the one lane road, set the lateral position to a third position in the traveling lane more distant from the intersecting road than the second position;
in response to i) the determining that the intersecting road is the blind spot, ii) the determining that the oncoming vehicle is not present, and iii) the determining that the traveling road of the own vehicle is the one lane road, determine whether the intersection is a crossroads;
in response to determining that the intersection is the crossroads, set the lateral position to a center of the traveling road; and
in response to determining that the intersection is not the crossroads, set the lateral position to a fourth position in the traveling road more distant from the intersecting road than the first position.

* * * * *